United States Patent [19]
Grant et al.

[11] Patent Number: 4,864,880
[45] Date of Patent: Sep. 12, 1989

[54] MANIPULATOR DRIVE MECHANISM

[75] Inventors: Daniel W. Grant, West Buxton; Walter Bell, Jr., S. Portland, both of Me.

[73] Assignee: Nu-Tec Corporation, Scarborough, Me.

[21] Appl. No.: 198,748

[22] Filed: May 25, 1988

[51] Int. Cl.⁴ .............................. F16H 55/18; F16H 21/44
[52] U.S. Cl. ............................................. 74/110; 74/409; 74/479; 901/17; 901/36
[58] Field of Search ....................... 414/729; 901/17, 23, 901/24, 25, 36; 74/409, 110, 479

[56] References Cited
U.S. PATENT DOCUMENTS
2,732,723   1/1956   Crofton .............................. 74/110
3,682,327   8/1972   Winne ............................... 901/25 X
4,317,560   3/1982   Troyer .............................. 901/23 X FOREIGN PATENT DOCUMENTS
61-98522   5/1986   Japan ................................ 901/17
965761   11/1980   U.S.S.R. ........................... 901/25

Primary Examiner—Leslie A. Braun
Assistant Examiner—Janice E. Chartoff
Attorney, Agent, or Firm—Staas & Halsey

[57] ABSTRACT

A manipulator drive mechanism employing splined shafts in both a vertical and a horizontal axes. The horizontal splined shaft is rotatably driven by a rack assembly and a pinion gear rotatably fixed with respect to the horizontal splined shaft and which is also slidable along the horizontal splined shaft.

14 Claims, 6 Drawing Sheets

MANIPULATOR DRIVE MECHANISM

BACKGROUND OF THE INVENTION

The present invention is directed to an automatic manipulator, and more particularly to an improved drive mechanism for an automatic manipulator such as a sprue picker apparatus.

Automatic manipulators in general are required to quickly and reliably perform repeatable tasks. The manipulator must accurately position itself in order to repeatedly perform a task. In the case of a sprue picker apparatus, such apparatus are typically mounted on a fixed platen or, in the case of smaller machines, on the frame adjacent to the fixed platen of an injection mold. After a part has been molded, the injection mold opens and the sprue picker apparatus must quickly remove the molded part. High-speed performance of this task is very desirable in order to minimize the amount of time that the injection mold is open. Therefore, it is very important that any sprue picker apparatus be able to quickly and precisely perform repeatable movements.

Typically, automatic manipulators such as sprue picker apparatus have three axes of movement: horizontal, vertical, and rotary. FIG. 1 is a perspective view of a conventional sprue picker apparatus. A gripper 10 is movable along a vertical axis 15 and rotatable about a horizontal axis 20 in the direction shown by the arrow A. In addition, the gripper 10 and the vertical axis 15 are movable along the horizontal axis 20. In order to provide precise movement of the gripper 10, conventional sprue picker apparatus typically employ vertical twin guide rods 25 and horizontal twin guide rods 30. Such twin rod assemblies are difficult to align; thus, making it difficult to minimize friction along the total stroke of the gripper 10. In addition, the twin rod assemblies are heavy and therefore slow the gripper 10.

Another problem with conventional sprue picker apparatus is that for rotary movement of the gripper 10 about the horizontal axis 20, they are subject to backlash. The improved sprue picker apparatus uses a double rack and gear mechanism to eliminate backlash at the rotational end positions.

Moreover, to achieve accurate positioning, the twin rods (25, 30) must be sufficiently rigid. Rigid rods, however are heavy and lower the maximum velocity at which the gripper 10 can be moved. Because the gripper 10 cannot be moved quickly, an injection mold must be held open for a longer period of time in order to remove parts; thus reducing the efficiency of the mold.

SUMMARY OF THE INVENTION

It is an object of the present invention to provide an improved manipulator drive mechanism.

It is another object of the present invention to provide a simple, high speed manipulator drive mechanism capable of repeated precision movements.

A further object of the present invention is to provide a rigid, low weight manipulator drive mechanism.

Still a further object of the present invention is to provide a manipulator drive mechanism that eliminates rotary movement backlash.

Still another object of the present invention is to provide a sprue picker drive mechanism that minimizes the amount of time that an injection mold is open.

Still another object of the present invention is to provide a sprue picker drive mechanism with improved positioning repeatability.

Still a further object of the present invention is to provide a sprue picker drive mechanism capable of easily interfacing with other manufacturing operations.

To achieve the above and other objects of the present invention, the manipulator drive mechanism of the present invention has a horizontal axis and a vertical axis, and comprises a horizontal splined shaft positioned along the horizontal axis; a first gear positioned about and movable along the axis of the horizontal splined shaft, the first gear being rotatably fixed with respect to the horizontal splined shaft; a double rack gear means for engaging the first gear so as to rotate said horizontal splined shaft while eliminating backlash at the end of rotation; a vertical splined shaft positioned along the vertical axis; and connecting means for operatively connecting the vertical splined shaft to the horizontal splined shaft.

In a preferred embodiment of the present invention, the first gear includes a pinion gear and the gear means comprises a rack gear and a floating rack gear positioned on opposing sides of the pinion so that linear movement of the rack gear causes the pinion gear to rotate and the floating rack gear to move linearly. In a preferred embodiment of the present invention, the connecting means includes a linear bearing housing which movably houses the vertical splined shaft and is connected to one end of the horizontal splined shaft so that rotation of the horizontal splined shaft, resulting from linear movement of the rack gear, causes the vertical splined shaft to rotate about the horizontal axis.

BRIEF DESCRIPTION OF THE DRAWINGS

In the accompanying drawings, which constitute part of the description of the present invention, like reference numerals identify the same or similar parts throughout.

DETAILED DESCRIPTION OF THE PREFERRED EMBODIMENTS

Figure 1:
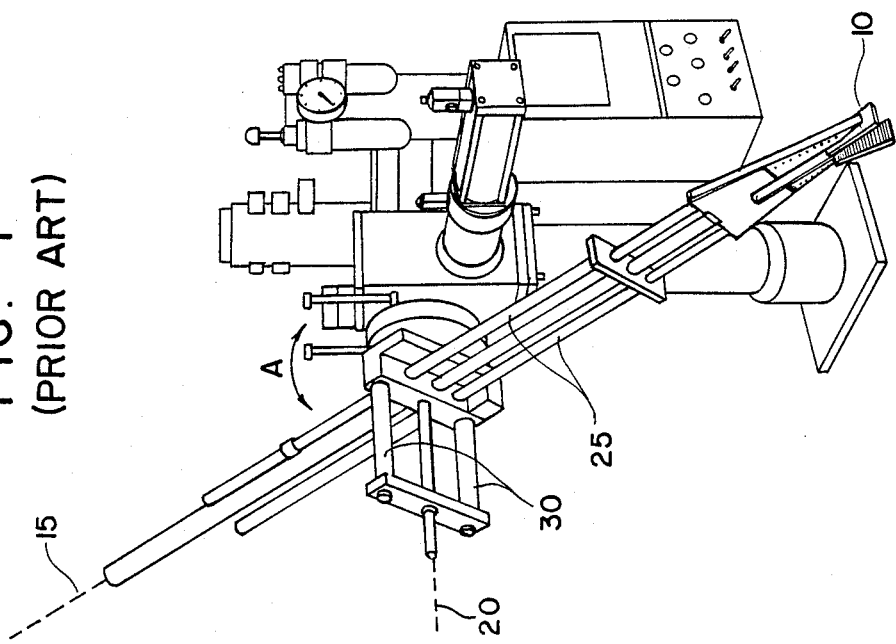
FIG. 1 is a perspective view of a conventional sprue picker apparatus.
Figure 2:
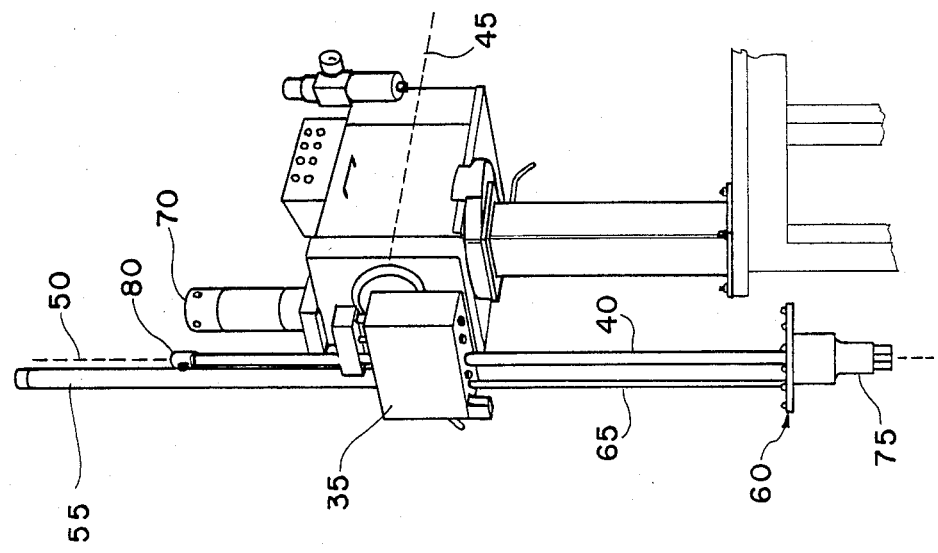
FIG. 2 is a perspective view of a sprue picker apparatus embodying the present invention.
Figure 5:
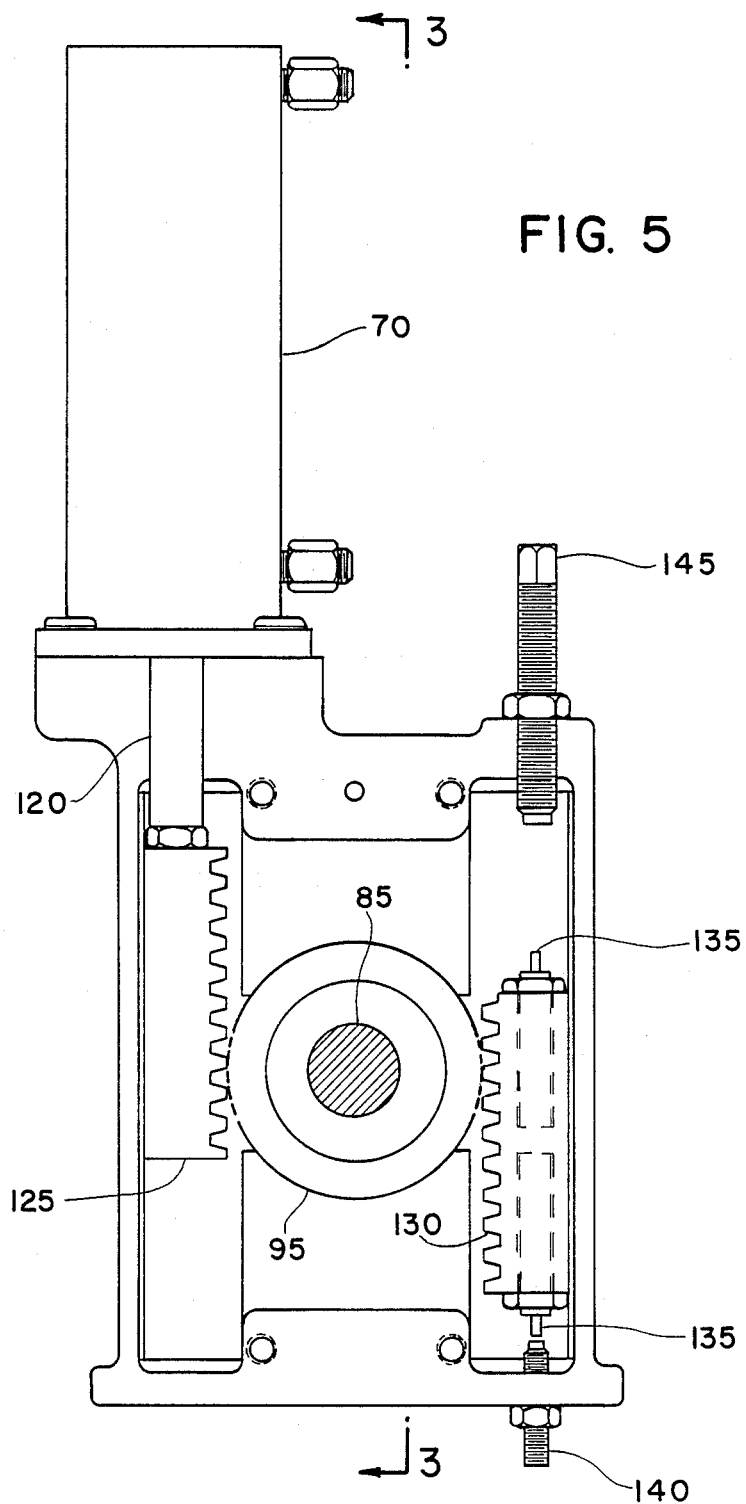
FIG. 5 is a cross-sectional view of the rotary axis of the drive mechanism, taken along line 5—5 in FIG. 3.
Figure 7:
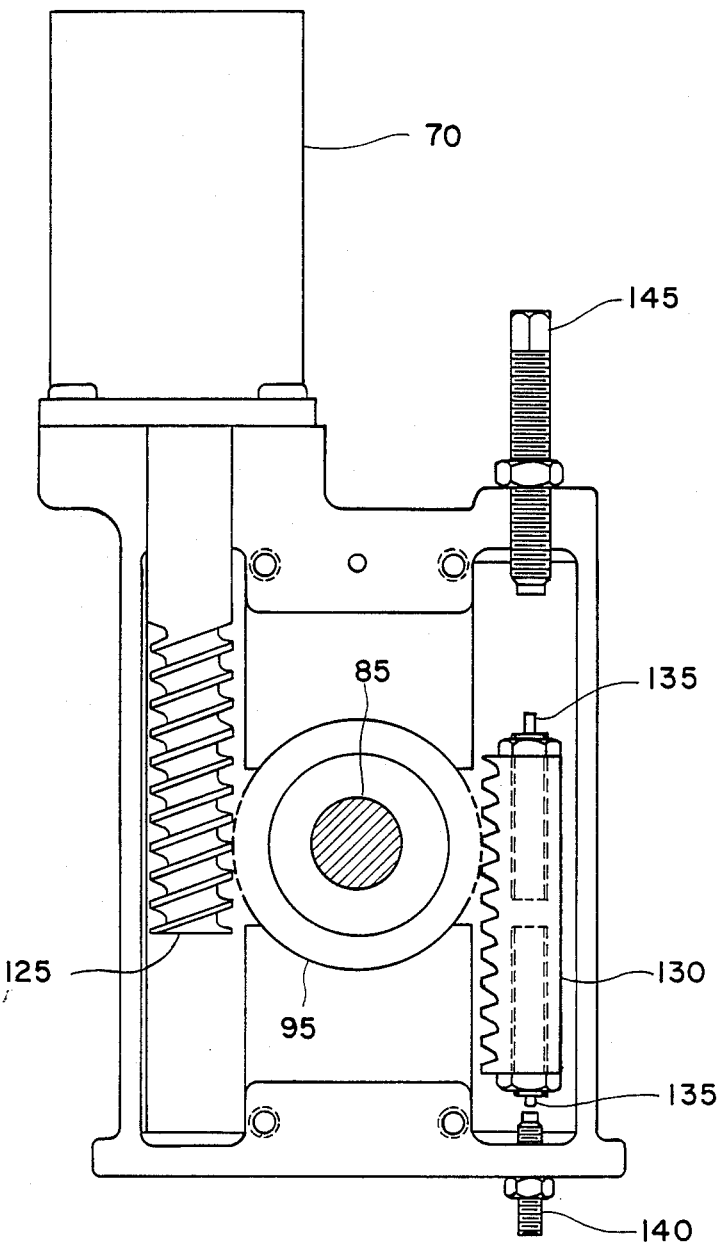

FIG. 2 is a perspective view of a sprue picker apparatus embodying the manipulator drive mechanism of the present invention. In FIG. 2 a connecting means 35 operatively connects a vertical splined shaft 40 to a horizontal splined shaft (not shown) positioned along a horizontal axis 45. The vertical splined shaft 40 is positioned along a vertical axis 50, and in the preferred embodiment of the present invention the splined shaft 40 is hollow. A vertical drive means 55 is connected through the connecting means 35 to a moving plate 60 by way of a vertical drive rod 65. The vertical splined shaft 40 is rotatable about the horizontal axis 45 by a rotary drive means 70 (FIGS. 5 and 7).

In FIG. 2 reference numeral 75 identifies a gripper means for gripping and releasing articles. The gripping means 75 is connected to the moving plate 60. In a preferred embodiment of the present invention, the gripper means 75 is moved by way of a movement means 80 and, for example, a rod (not shown) positioned within the hollow vertical splined shaft 40. The rod transmits a movement control input provided by the movement means 80 to the gripper means 75 so that the gripper means 75 can grip and release articles in accordance with the movement control input. This structure is described in more detail below with respect to FIG. 6.

Figure 3:
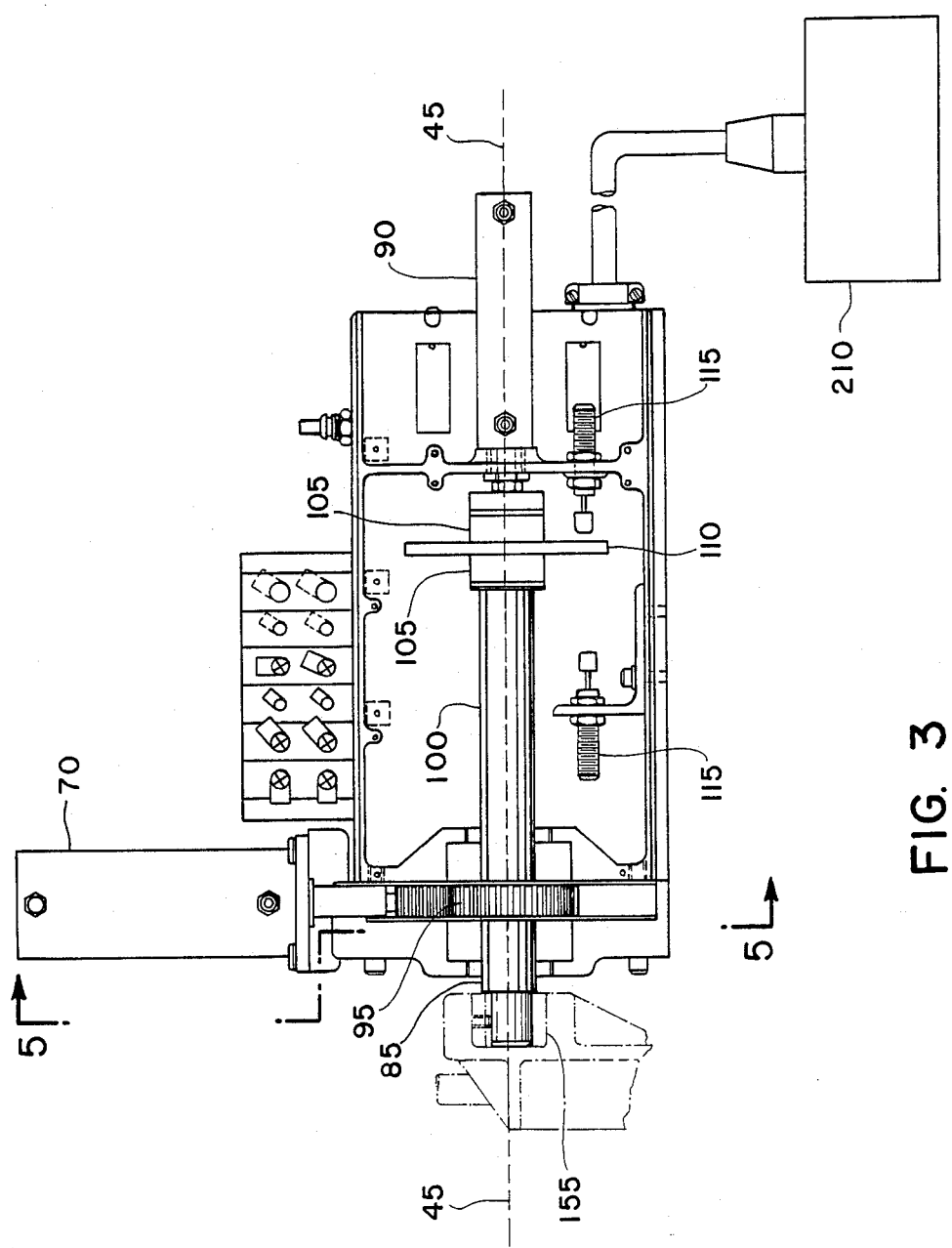
FIG. 3 is a cross-sectional view of the horizontal and rotary axes of a drive mechanism embodying the drive mechanism of the present invention.

FIG. 3 is a cross-sectional view of the horizontal and rotary axes assembly of a sprue picker apparatus employing the improved drive mechanism of the present invention. Referring to FIG. 3, a horizontal splined shaft 85 is positioned along the horizontal axis 45. The horizontal drive means 90 is connected to one end of the horizontal splined shaft 85 and moves the horizontal splined shaft 85 along the horizontal axis 45. The horizontal drive means 90 can comprise, for example, an air cylinder model No. NCG 25 or NCG 32 manufactured by SMC Pneumatics Inc., 3011 N. Franklin Rd., P.O. Box 26440, Indianapolis, Ind. 46226 or equivalent.

Figure 4:
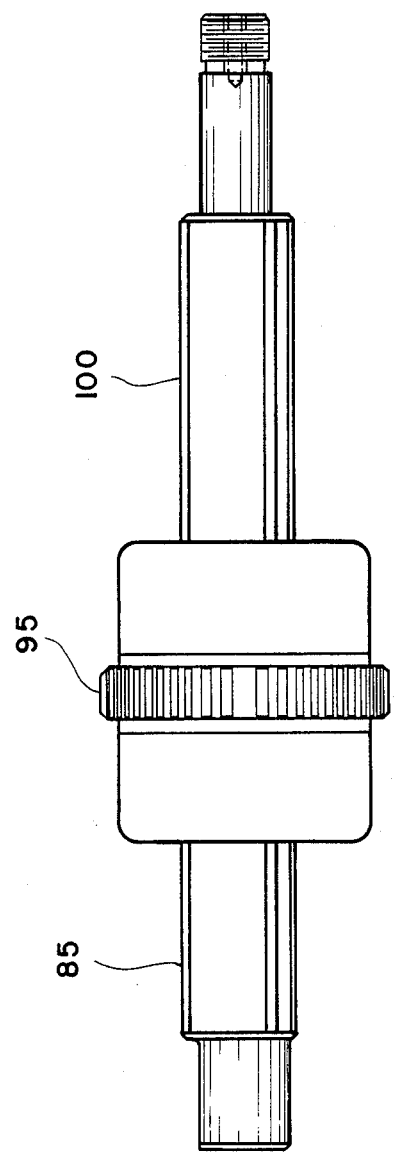
FIG. 4 is a side view of a splined shaft employed in preferred embodiment of the present invention.

The splined shaft 85 has positioned therearound a first gear 95 which is movable along the horizontal splined shaft 85. The horizontal splined shaft is illustrated in FIG. 4. The first gear or pinion gear 95 is movable along the splined shaft 85, and is rotatably fixed with respect to the horizontal splined shaft 85 by way of the splines 100 on the splined shaft 85. The first gear 95 slides along the horizontal splined shaft 85 on linear ball bearings housed within the first gear 95. The splined shaft employed in the preferred embodiment of the present invention may, for example, be manufactured by THK Co., Ltd. of 3-6-4, Kami-Osaki, Shinagawa-ku, Tokyo 141, Japan. Equivalent shafting by others may also be used.

Referring to FIG. 3, in the preferred embodiment the splined shaft 85 rotates within two thrust bearings 105. A stop disk 110 together with horizontal shock absorbers 115 serve to limit the horizontal motion of the splined shaft 85 when driven by the horizontal drive means 90.

FIG. 5 is a cross-sectional view of the rotary axis illustrated in FIG. 3. Referring to FIG. 5, the rotary drive means 70 moves a drive rod 120 so as to cause a second gear 125 to rotate the first gear 95. The rotary drive means 70 can for example, comprise an air cylinder model No. NCG 63 or NCG 80 manufactured by SMC Pneumatics Inc. As illustrated in FIG. 5, the second gear 125 comprises a rack gear which engages the first gear (pinion gear) 95. Linear motion of the piston 120 causes the rack gear 125 to move linearly; and thus to rotate the pinion gear 95.

The second gear 125 can also comprise a worm gear which would then be rotated by a member 120 so as to cause a pinion gear 95 to rotate. See FIG. 7 showing this variation in rotary drive mechanism.

A floating gear 130 engages the pinion gear 95. The floating gear or floating rack gear 130 has positioned on either end thereof shock absorbers 135. The shock absorbers 135 can comprise Series NRB shock absorbers manufactured by SMC Pneumatics Inc. or equivalent. The shock absorbers 135, together with a stop bolt 140 and an adjustable stop bolt 145, limit the rotary motion of the horizontal splined shaft 85. For example, when the rotary drive means 70 extends the piston 120 so as to move the second gear 125 down, the first gear (pinion gear) 95 rotates in a counter-clockwise direction. This causes the floating gear (floating rack gear) 130 to move upwards towards the adjustable stop bolt 145. When the upper shock absorber 135 contacts the adjustable stop bolt 145, counter clockwise motion of the horizontal splined shaft 85 stops. Similarly, when the lower shock absorber 135 contacts the stop bolt 140, clockwise rotary motion of the horizontal splined shaft stops. The combination of the second gear 125 and floating rack gear 130 eliminates backlash at the endpoints of rotary motion of the horizontal splined shaft 85.

Figure 6:
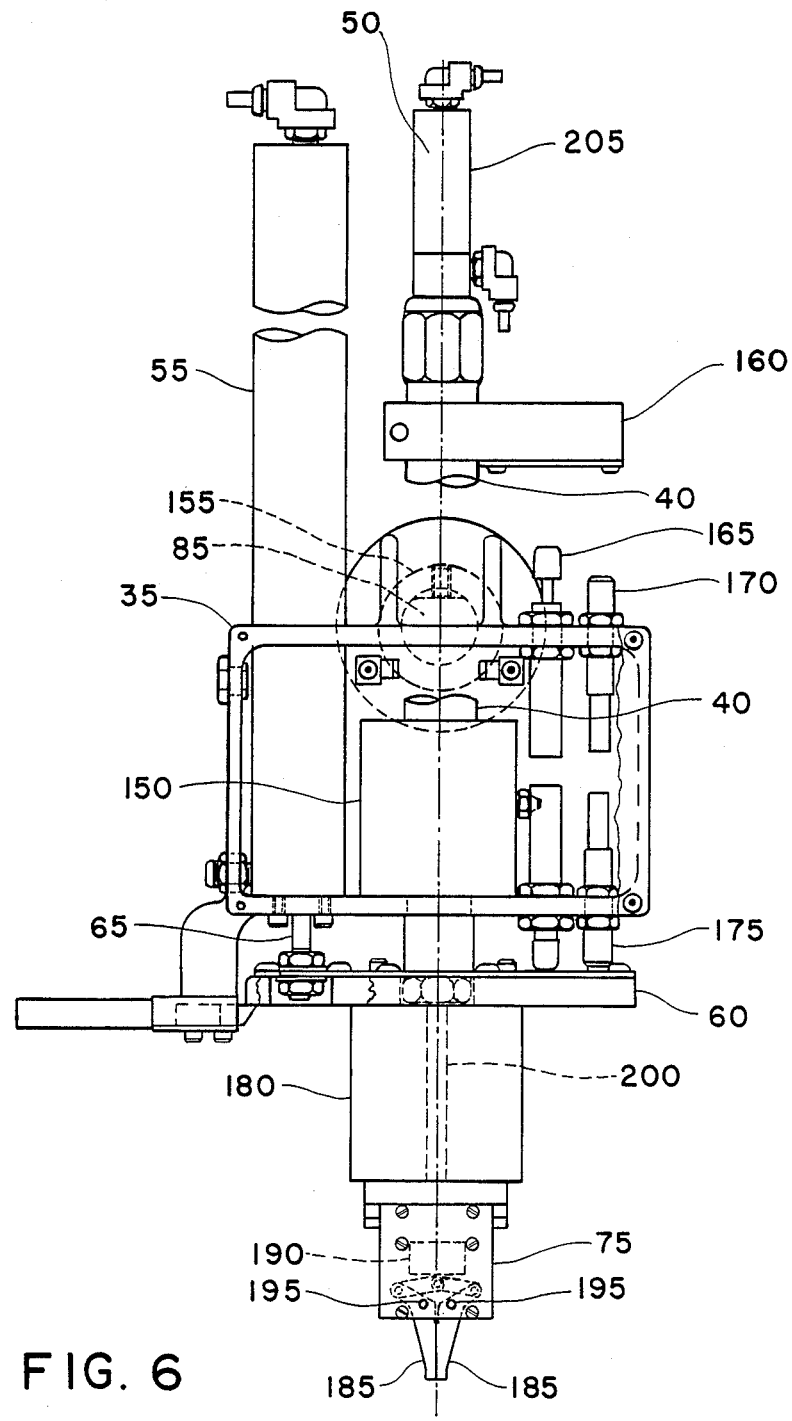
FIG. 6 illustrates a vertical axis embodying the drive mechanism of the present invention; and, FIG. 7 is a cross-sectional view of the rotary axis of a modified drive mechanism of the present invention.

Referring to FIG. 6, the vertical splined shaft 40 is positioned along the vertical axis 50. The vertical splined shaft 40 slides within a bearing means 150. The bearing means 150 is fixed to the housing 35, which in turn is connected to the horizontal splined shaft 85 by way of a coupling 155, e.g., keyless shaft/hub connectors, such as those manufactured by BIKON Corporation of Monroe, N.Y. Together, the bikon coupling 155 and housing 35 comprise a connecting means for connecting the bearing means 150 to the horizontal splined shaft 85. As a result of this connection, when the horizontal splined shaft 85 rotates about the horizontal axis 45, the vertical splined shaft 40 also rotates about the horizontal axis 45.

Due to the splines on the vertical splined shaft 40, the vertical splined shaft 40 does not rotate with respect to the bearing means 150. Consequently, because the bearing means 150 is fixed to the housing 35, the vertical splined shaft 40 is rotatably fixed with respect to the housing 35.

The vertical drive means 55 can comprise for example, an air cylinder model No. NCG 32 or NCG 40 manufactured by SMC Pneumatics Inc. Equivalent hardware may also be used. As shown in FIG. 6, the vertical drive rod 65 is connected to the moving plate 60. In addition, an end of the vertical splined shaft 40 is bolted to the moving plate 60. The moving plate 60 therefore, operatively connects the vertical drive means 55 and the vertical splined shaft 40. As a result, when the vertical drive means 55 actuates the vertical drive rod 65, the moving plate 60 is moved along the vertical axis 50 together with the vertical splined shaft 40. As the vertical drive rod 65 moves the moving plate 60 along the vertical axis 50, this motion is stopped by contact of a stroke setting block assembly contacting a shock absorber 165. A proximity detector 170 detects when the moving plate 60 is near the housing 35. The proximity detectors 170 and 175 provide a controller 210 (described below) with information so as to control the vertical drive means 55. Similar means are used to detect position and provide inputs to controller 210 on the other axes of motion. The proximity detectors (170, 175) can comprise any type of proximity detector. Applicants have used, for example, proximity switches manufactured by Allen-Bradley, Milwaukee, Wis. 53201-2086, Types J,K,N,P and Series A.

In FIG. 6, reference numeral 75 identifies a gripper means. As illustrated, this gripper means is operatively connected to the moving plate by way of a spacer 180. The gripper means 75 includes fingers 185 for gripping and releasing articles. As shown in FIG. 6, movement of a lever assembly 190 along the vertical axis 50 causes fingers 185 to rotate about pivot points 195; thus, opening and closing fingers 185.

As illustrated in FIG. 6, the gripper means 75 is controlled by a rod 200 positioned within the hollow vertical splined shaft 40 and connected to a movement means 205. The movement means can comprise an air cylinder model No. NCG 20 or NCG 25 manufactured by SMC Pneumatics Inc. or equivalent. Alternatively, the movement means can comprise a vacuum source connected to the gripper means 75 by way of a tube. In the case of a vacuum source, the gripper means 75 normally operates on suction rather than on the mechanical pinching of fingers 185. The air cylinder or movement means 205 provides a mechanical movement control input to the lever assembly 190 causing the fingers 185 to open and close in accordance with the movement of the rod 200 induced by the movement means 205.

The controller 210, shown in FIG. 3, can comprise any type of programmable controller or hard wire controller capable of moving the various axes of the drive mechanism. In the preferred embodiment of the present invention, the controller 210 comprises a programmable controller, model SLC 150 manufactured by Allen-Bradley or equivalent. This programmer is programmed in accordance with standard ladder diagram programming format well known to those skilled in the art. The controller receives, for example, from the manipulator drive mechanism signals indicating the position of the horizontal splined shaft, the vertical splined shaft and the rotational position of the horizontal splined shaft. In addition, the controller receives information indicating the state of the gripper means or fingers. For safety purposes, the controller 210 also receives signals from, for example, an injection molding machine indicating the state of the mold. Based on these signals from the injection mold, the controller 210 permits or prevents the gripper means from entering the mold and moves the drive mechanism per the ladder diagram's input to the controller.

What is claimed is:

1. A manipulator drive mechanism having a horizontal axis and a vertical axis, comprising:
   a horizontal splined shaft positioned along the horizontal axis;
   a first gear positioned about and movable along said horizontal splined shaft, said first gear being rotatably fixed with respect to said horizontal splined shaft;
   gear means for engaging said first gear so as to rotate said horizontal splined shaft;
   a vertical splined shaft positioned along the vertical axis; and
   connecting means for operatively connecting said vertical splined shaft to said horizontal splined shaft.

2. The manipulator drive mechanism according to claim 1, wherein said gear means comprises:
   a second gear positioned to engage said first gear such that movement of said second gear causes said first gear to rotate; and
   a floating gear positioned to engage said first gear so as to be moved by rotation of said first gear, and to provide a mechanism for limiting rotational movement of the horizontal splined shaft.

3. A manipulator drive mechanism according to claim 2, wherein said first gear comprises a pinion gear.

4. A manipulator drive mechanism according to claim 2, wherein said second gear and said floating gear each comprise a rack gear.

5. A manipulator drive mechanism according to claim 2, wherein said second gear comprises a worm gear.

6. A manipulator drive mechanism according to claim 2, further comprising:
   rotary drive means for linearly moving said second gear so as to rotate said horizontal splined shaft about the horizontal axis.

7. A manipulator drive mechanism according to claim 6, further comprising:
   horizontal drive means, operatively connected to said horizontal splined shaft, for moving said horizontal splined shaft along the horizontal axis; and
   vertical drive means, operatively connected to said connecting means and to said vertical splined shaft, for moving said vertical splined shaft along the vertical axis.

8. A manipulator drive mechanism according to claim 5, further comprising rotary drive means for rotating said second gear so as to rotate said horizontal splined shaft about the horizontal axis.

9. A manipulator drive mechanism according to claim 7, wherein said connecting means comprises a housing means, operatively connected to an end of said horizontal splined shaft, for movably housing said vertical splined shaft.

10. A manipulator drive mechanism having a horizontal axis and a vertical axis, comprising:
    a horizontal splined shaft positioned along the horizontal axis;
    a pinion gear positioned around and moveable along said horizontal splined shaft, and being rotatably fixed with respect to said horizontal splined shaft;
    a rack gear positioned to engage said pinion gear so that movement of said rack gear causes said pinion gear to rotate;
    a floating rack gear positioned so that rotation of said pinion gear causes said floating rack gear to move linearly;
    bearing means, positioned around and movable along said vertical splined shaft, for preventing rotation of said vertical splined shaft about the vertical axis;
    connecting means for operatively connecting said bearing means to said horizontal splined shaft so that rotation of said horizontal shaft about the horizontal axis causes said vertical splined shaft to rotate about the horizontal axis;
    a moving plate connected to an end of said vertical splined shaft;
    vertical drive means for moving said moving plate with respect to said bearing means;
    gripper means, operatively connected to said moving plate, for gripping and releasing articles in accordance with a movement control input; and
    gripper control means for providing said movement control input so that said gripper means grips and releases articles.

11. A manipulator drive mechanism according to claim 10, wherein said vertical splined shaft is hollow.

12. A manipulator drive mechanism according to claim 11, wherein said gripper control means comprises:
    a rod positioned with said vertical splined shaft and having a first end operatively connected to said gripper means; and movement means, connected to a second end of said rod, for providing said movement control input.

13. A manipulator drive mechanism according to claim 11, wherein said gripper control means comprises a vacuum means for generating a vacuum and selectively providing the vacuum to said gripper means as said movement control input.

14. A manipulator drive apparatus having a horizontal axis and a vertical axis, comprising:
- a horizontal splined shaft positioned along the horizontal axis;
- a first gear positioned about and movable along said horizontal splined shaft, said first gear being rotatably fixed with respect to said horizontal splined shaft;
- gear means for engaging said first gear so as to rotate said horizontal splined shaft;
- a vertical splined shaft positioned along the vertical axis;
- gripper means, operatively connected to said vertical splined shaft, for gripping articles;
- connecting means for operatively connecting said vertical splined shaft to said horizontal splined shaft; and
- control means for moving said horizontal splined shaft along the horizontal axis, for rotating said horizontal splined shaft about the horizontal axis, for moving said vertical splined shaft along the vertical axis, and for actuating said gripper means.

* * * * *